(12) United States Patent
Herman et al.

(10) Patent No.: US 10,735,716 B2
(45) Date of Patent: Aug. 4, 2020

(54) VEHICLE SENSOR CALIBRATION

(71) Applicant: Ford Global Technologies, LLC, Dearborn, MI (US)

(72) Inventors: David Michael Herman, Oak Park, MI (US); Venkatesh Krishnan, Canton, MI (US); Sunil Patil, Troy, MI (US); Ashwin Arunmozhi, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/208,683

(22) Filed: Dec. 4, 2018

(65) Prior Publication Data

US 2020/0177872 A1    Jun. 4, 2020

(51) Int. Cl.
*G06T 7/80* (2017.01)
*H04N 17/00* (2006.01)
*G06K 9/00* (2006.01)

(52) U.S. Cl.
CPC ....... *H04N 17/002* (2013.01); *G06K 9/00791* (2013.01)

(58) Field of Classification Search
CPC .................. G06T 7/80; G06T 2207/30252
See application file for complete search history.

(56) References Cited

U.S. PATENT DOCUMENTS

| | | | | |
|---|---|---|---|---|
| 5,729,016 | A * | 3/1998 | Klapper | B60R 1/00 250/332 |
| 8,134,693 | B2 * | 3/2012 | Ciolli | G08G 1/052 356/28 |
| 8,248,471 | B2 * | 8/2012 | Inui | G06T 7/80 348/118 |
| 9,438,897 | B2 * | 9/2016 | Barreto | H04N 17/002 |
| 9,491,451 | B2 * | 11/2016 | Pliefke | B60R 1/002 |
| 9,900,490 | B2 * | 2/2018 | Ihlenburg | H04N 7/183 |
| 10,196,047 | B1 * | 2/2019 | Hansen | B60S 1/481 |
| 2005/0280709 | A1 * | 12/2005 | Katayama | G01C 11/02 348/187 |

(Continued)

FOREIGN PATENT DOCUMENTS

DE   102015007794 A1   12/2015
DE   102016105569 A1    9/2017
(Continued)

OTHER PUBLICATIONS

Bell et al., "Method for out-of-focus camera calibration", Applied Optics, vol. 55, No. 9, Mar. 20, 2016.

(Continued)

*Primary Examiner* — Paulos M Natnael
(74) *Attorney, Agent, or Firm* — Frank A. MacKenzie; Bejin Bieneman PLC

(57) ABSTRACT

A system, comprising a computer that includes a processor and a memory, the memory storing instructions executable by the processor to actuate a first actuator movingly connected to the camera cover and the light to move the calibration pattern and the light to cover a lens window of a camera. The processor can further execute instructions to actuate a second actuator movingly connected to the calibration pattern and the light to move the calibration pattern and the light along an optical axis of the camera.

20 Claims, 10 Drawing Sheets

(56) References Cited

U.S. PATENT DOCUMENTS

| | | | |
|---|---|---|---|
| 2010/0194886 A1* | 8/2010 | Asari | G06T 7/85 |
| | | | 348/148 |
| 2014/0368838 A1* | 12/2014 | Tassakos | G01B 11/002 |
| | | | 356/623 |
| 2015/0036047 A1* | 2/2015 | Bledsoe | H04N 5/2254 |
| | | | 348/375 |
| 2015/0165972 A1* | 6/2015 | Takemae | G06K 9/00805 |
| | | | 348/148 |
| 2015/0165973 A1* | 6/2015 | Takemae | G08G 1/167 |
| | | | 348/148 |
| 2017/0136962 A1* | 5/2017 | Morita | H04N 13/239 |
| 2019/0002125 A1* | 1/2019 | Bin | B64D 47/08 |
| 2019/0124232 A1* | 4/2019 | Herman | B60W 30/00 |

FOREIGN PATENT DOCUMENTS

| | | |
|---|---|---|
| JP | 201678724 A | 5/2016 |
| WO | 2015090529 A1 | 6/2015 |

OTHER PUBLICATIONS

Tao et al., "Camera Calibration with Phase-Shifting Wedge Grating Array", Applied Sciences Apr. 20, 2018, doi:10.3390/app040644; www.mdpi.com/journal/applsci.

Wang et al., "Out-of-focus color camera calibration with one normal-sized color-coded pattern", Optics and Lasers in Engineering 98 (2017) 17-22, http://www.elsevier.com/locate/optlaseng.

* cited by examiner

VEHICLE SENSOR CALIBRATION

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
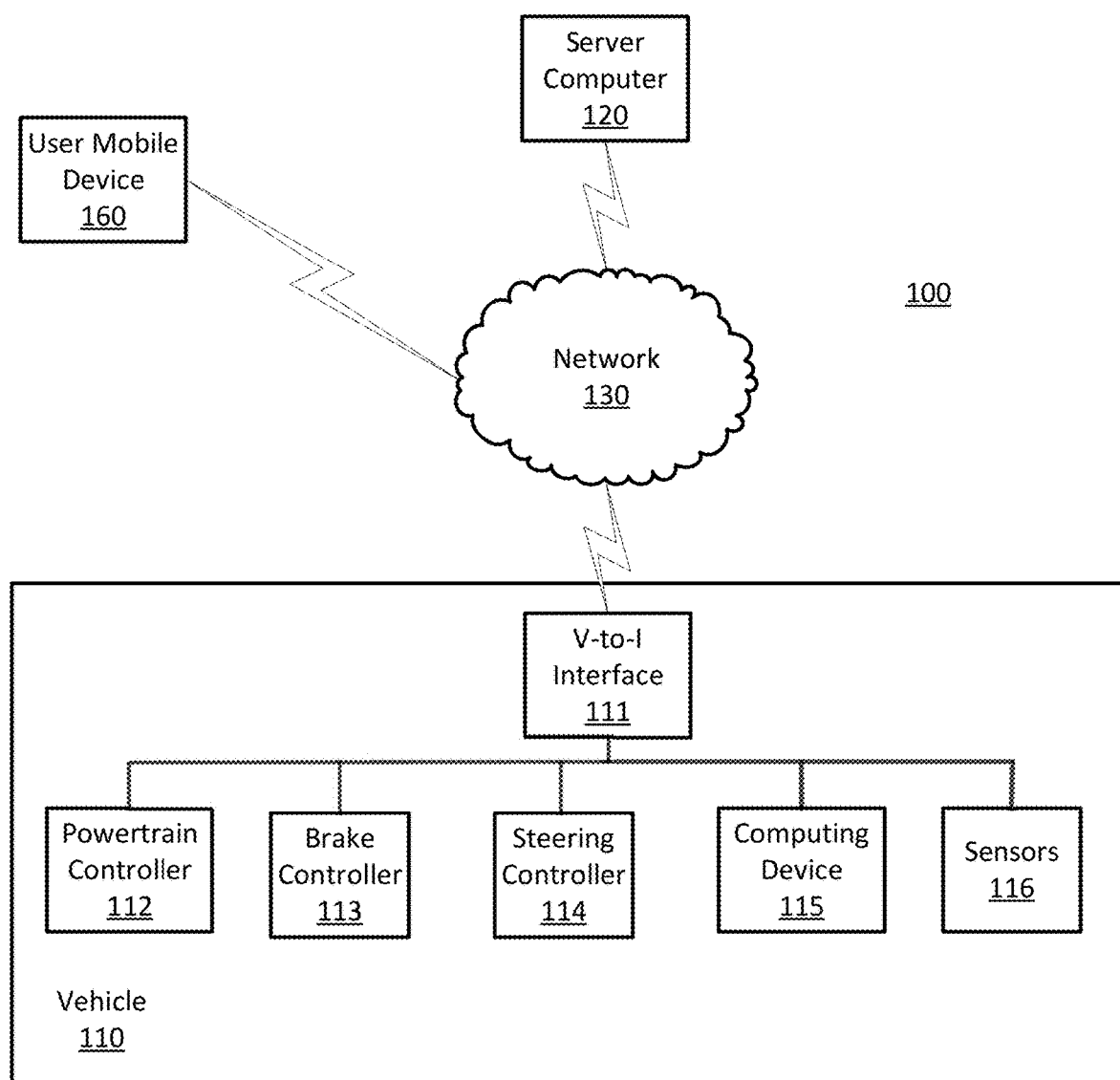
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of a vehicle information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire sensor data regarding the external environment of a vehicle and to use the sensor data to determine trajectories to be used to operate a vehicle in autonomous or semi-autonomous mode. For example, the computing device can provide information to controllers (e.g., electronic control units or ECUs) to operate vehicle on a roadway in traffic including locations of objects including other vehicles and pedestrians. Based on sensor data, a computing device can determine a path for a vehicle to travel to reach a destination on a roadway in the presence of objects including other vehicles and pedestrians. A vehicle sensor can include optical components such as a transparent lens window exposed to the external environment. The external environment can include inclement weather like snow and freezing rain and contaminants like dust and mud that can obscure the lens window. The temperature and humidity of the external environment can also vary, causing distortions in optical components. Operating a vehicle can depend upon a computing device detecting and correcting degraded sensor data caused by the external environment and its interaction with sensor systems.

Disclosed herein is a system, including a light, a camera cover including a calibration pattern, a first actuator movingly connected to the camera cover and the light to deploy the calibration pattern and the light to cover a lens window of a camera, and a second actuator movingly connected to the calibration pattern and the light to move the calibration pattern and the light along an optical axis of the camera. A computer can be programmed to actuate the first actuator to move the camera cover and the light to cover the lens window of the camera based on spectral analysis of image data. A fluid spray nozzle can be arranged to spray one or more of a fluid and air onto the lens window of the camera wherein the computer is further programmed to determine when to spray the fluid and air based on analyzing an image of the calibration pattern to determine if the lens window is clean or dirty. It can be determined if the lens window is clean or dirty is based on a ground truth image of the calibration pattern.

The computer can be further programmed to actuate the second actuator to move the calibration pattern and the light along the optical axis of the camera based on determining when the image of the calibration pattern is in focus. It can be determined when the image of the calibration pattern is in focus is based on one or more of a color calibration pattern and phase-shifting. The calibration pattern can include one or more of a plurality of black and white patterns and a plurality of color patterns. The calibration pattern can include one or more of a reflective pattern, a back-lit LCD display, an LED display and a phosphorescent pattern. The light can include one or more of front-light LEDs, back-light LEDs, and display LEDs. Spectral analysis can includes dividing the image data into regions and performing Fourier transforms on the regions. The Fourier transformed regions can be divided into low frequency, medium frequency and high frequency sub-regions. The color calibration pattern can include color patterns that focus at different planes. Phase-shifting can include black and white patterns that cause aliasing when de-focused.

Further disclosed is a computer readable medium, storing program instructions for executing some or all of the above method steps. Further disclosed is a computer programmed for executing some or all of the above method steps, including a computer apparatus, programmed to deploy a camera cover including a calibration pattern and a light to cover a lens window of a camera, and move a second actuator connected to the calibration pattern and the light to move the calibration pattern and the light along an optical axis of a camera. A computer can be programmed to actuate the first actuator to move the camera cover and the light to cover the lens window of the camera based on spectral analysis of image data. A fluid spray nozzle can be arranged to spray one or more of a fluid and air onto the lens window of the camera wherein the computer is further programmed to determine when to spray the fluid and air based on analyzing an image of the calibration pattern to determine if the lens window is clean or dirty. It can be determined if the lens window is clean or dirty is based on a ground truth image of the calibration pattern.

The computer apparatus can be further programmed to actuate the second actuator to move the calibration pattern and the light along the optical axis of the camera based on determining when the image of the calibration pattern is in focus. It can be determined when the image of the calibration pattern is in focus is based on one or more of a color calibration pattern and phase-shifting. The calibration pattern can include one or more of a plurality of black and white patterns and a plurality of color patterns. The calibration pattern can include one or more of a reflective pattern, a back-lit LCD display, an LED display and a phosphorescent pattern. The light can include one or more of front-light LEDs, back-light LEDs, and display LEDs. Spectral analysis can includes dividing the image data into regions and performing Fourier transforms on the regions. The Fourier transformed regions can be divided into low frequency, medium frequency and high frequency sub-regions. The color calibration pattern can include color patterns that focus at different planes. Phase-shifting can include black and white patterns that cause aliasing when de-focused.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. Vehicle 110 also includes one or more computing devices 115 for processing data for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
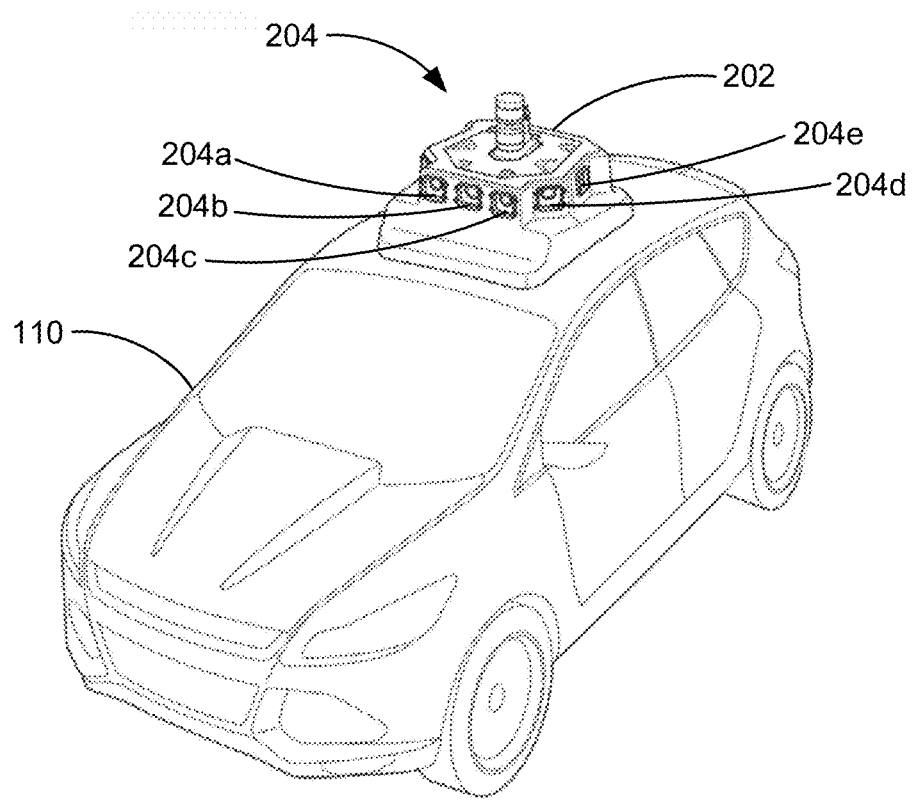
FIG. 2 is a diagram of an example vehicle including a sensor housing.

FIG. 2 is a diagram of a vehicle 110 including a sensor housing 202. Sensor housing 202 can be attached to a roof portion of vehicle 110, for example. A sensor housing 202 can include one or more sensors 116, for example video sensors. A sensor housing 202 can mount sensors 116 and protect sensors 116 from the external environment. To protect sensors 116 while permitting data acquisition, a sensor housing can include one or more lens windows 204a, 204b, 204c, 204d, 204e, referred to collectively herein as lens windows 204, each corresponding to a sensor 116, for example a video sensor.

Sensor housing 202 including lens windows 204 are exposed to the external environment in which vehicle 110 operates. The external environment in which vehicle 110 operates can include inclement weather and contaminants that can obscure a lens window 204 and thereby prevent a sensor 116 from acquiring accurate data regarding the external environment. Accurate data regarding the external environment is important for operation of vehicle 110 by computing device 115. Computing device 115 can require a 99% confidence that a sensor 116 is acquiring accurate data before using the sensor data to operate vehicle 110. A confidence level can be determined based on external ground truth, and/or cross-reference with another sensor 116 having an overlapping field of view. External ground truth can be an external calibration pattern, placed at a far field imaging focal distance (i.e. tens of meters) from a sensor 116. Difficulties with external calibration patterns addressed herein include availability and alignment. An external calibration pattern typically must be artificially illuminated to prescribed levels, and positioned accurately with respect to a vehicle 110, to provide image data that can be used to analyze a condition of a lens window. The operation of an external calibration pattern would have to be coordinated with data acquisition by a vehicle 110, thereby requiring a depot, service location, or other facility equipped for video calibration of a vehicle 110 deployed in the field.

Data from a first sensor 116 can be compared to data from a second sensor 116 having a similar or overlapping field of view. Data from a sensor 116 can also be compared to data from other sensors 116 including a lidar sensor and a radar sensor, for example, to determine if a sensor window 204 is contaminated or "dirty" or uncontaminated or "clean". Data from sensor 116 can also be compared to data from other sensors 116 to detect distortion of the image data from a sensor 116, due to temperature change, for example. Difficulties with comparing sensor data with another sensor 116 is that the other sensor 116 has a window also exposed to the same external environment as sensor window 204 and can therefore also be contaminated or hindered by inclement weather. Sensor 116 cross-referencing can detect complete failure of a sensor 116, but localized degradation and marginal operation are more difficult to determine. Techniques discussed herein include ground truth calibration patterns in a sensor housing 202 for use during operation of a vehicle 110 that can be used to detect both localized contamination of a lens window 204 and overall contamination of a lens window 204 with high sensitivity and high specificity. Sensitivity is a measure of how well a process determines positive cases ("true positives") compared to the actual number of positive cases in the sample. Specificity is a measure of how well a process determines negative cases ("true negatives") compared to the actual number of negative cases in the sample (sometimes referred to as a false alarm rate).

Figure 3:
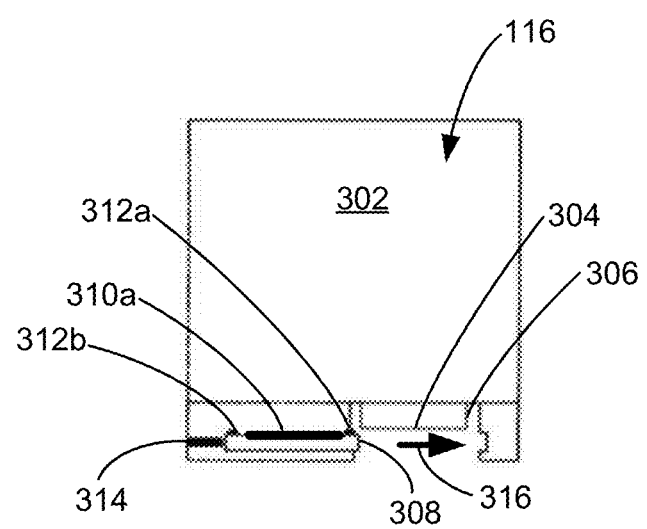
FIG. 3 is a diagram of an example sensor housing.

FIG. 3 is a diagram of a sensor housing 302. Sensor housing 302 includes a sensor 116, which can be a video sensor, protected by and mounted in sensor housing 302. Sensor housing 302 includes a transparent lens window 304 that protects sensor 116 while permitting data acquisition, including video data acquisition through the lens window 304. The lens window 304 can be glass and can be tempered for strength, or the lens window can be a transparent plastic, for example an acrylic plastic like LEXAN™. The sensor housing 302 can be exposed to the external environment or can be included within the interior of a body portion of vehicle 110. The lens window 304 however, is always exposed to the external environment, and for this reason can be obscured by contamination from inclement weather and other contaminants in the external environment. Lens window 304 includes a spray nozzle 306 that can spray one or more of liquid and air onto lens window 304 to clean the contaminated or dirty lens window 304 of water, ice, dust, and/or mud contamination, for example. The lens window 304 can also be heated by heating the liquid or air as it is being sprayed onto lens window 304, and thereby melt snow or ice accumulations, for example. The liquid can be water and/or can include one or more of a detergent and an antifreeze, for example. Because vehicle 110 can include a limited supply of liquid to clean lens window 304, computing device 115 can increase a service time interval corresponding to refilling a liquid reservoir by limiting lens window 304 cleaning by spray nozzle 306 to times when lens window 304 contamination can be determined with high (>90%) specificity wherein specificity is a measure of a false alarm rate as defined above.

Sensor housing 302 includes a camera cover 308. Camera cover 308 is moveably attached to sensor housing 302, permitting camera cover 308 to move in directions indicated by arrow 316 with respect to sensor housing 302, while remaining attached to sensor housing 302 by means of slides, bearings, hinges, or articulated fixtures, for example. Motion of camera cover 308 with respect to sensor housing 302 can be controlled by an actuator 314. Actuator 314 can be operatively attached to camera cover 308 to permit actuator 314, when actuated, to deploy camera cover 308 in the direction indicated by arrow 316. Actuator 314 can further be actuated to return camera cover 308 to the position illustrated in FIG. 3. Actuator 314 can be electromechanical, such as a solenoid or rotary or linear motor, pneumatic, or hydraulic, for example. Actuator 314 can also include limit switches that sense positions of actuator 314 and thereby indicate the position of camera cover 308 to computing device 115.

Camera cover 308 includes a calibration pattern 310a and lights 312a, 312b referred to collectively herein as lights 312. Calibration pattern 310a can be a substrate with a color, greyscale, black and white, or phosphorescent pattern applied to the substrate to reflect or re-emit light radiation emitted by lights 312 configured as front-light LEDs through lens window 304 to a sensor 116. Lights 312 can be light emitting diodes (LEDs) in a variety of colors including red, green, blue, and white. Calibration pattern 310a can be an electro-optical device, including an LCD or LED display. When calibration pattern 310a is an LCD display, lights 312 can be configured as back-light LEDs, wherein red, green, and blue (RGB) LEDs can emit light energy through an LCD panel in a variety of patterns and colors, for example. Other wavelengths of light, such as infrared (IR) can be used. When calibration pattern 310a is an LED display, lights 312 are configured as display LEDs, wherein RGB LEDs can emit light energy in a variety of patterns and colors directly to form calibration pattern 310a through lens window 304 to be detected by sensor 116.

Figure 4:
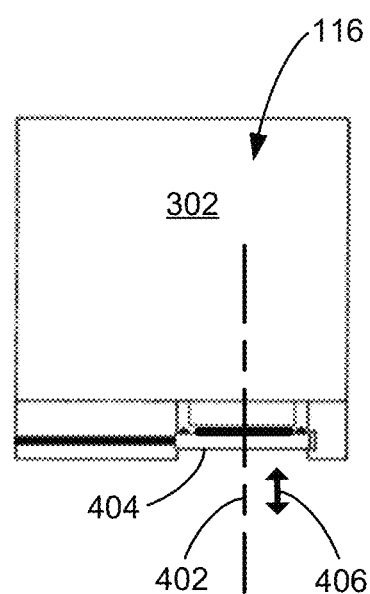
FIG. 4 is another diagram of an example sensor housing.

FIG. 4 is a diagram of an example sensor housing 302, with camera cover 308 deployed by actuator 314 to cover and thereby protect lens window 304. When camera cover 308 is deployed, calibration pattern 310a is positioned along and perpendicular to an optical axis 402 of sensor 116. An optical axis is a line in 3D (three-dimensional) space perpendicular to a sensor plane of a video sensor, which passes through an optical center of a lens such as a video sensor lens included in a video sensor. A sensor plane is a plane formed by the active surface of an electro-optical device such as a semiconductor video image sensor. Camera cover 308 includes a second actuator 404 to move the calibration pattern 310a and lights 312 in the direction indicated by arrow 406 along optical axis 402 of sensor 116 included in sensor housing 302. Second actuator 404 can be electromechanical including one or more of a solenoid, a voice coil, or a piezo-electric crystal. Second actuator 404 moves calibration pattern 310a and lights 312 while actuator 314 maintains camera cover 308 in deployed position, thereby continuing to protect lens window 304. Second actuator 404 can move calibration pattern 310a and lights 312 small distances (1-5 mm) at high resolution (<0.1 mm) along the optical axis 402 of sensor 116 to change the focus of the calibration pattern 310a in image data acquired by sensor 116. Focus, as it pertains to optical systems like video sensors, is defined as a measure of convergence of light rays at an image plane emitted from an object in a field of view.

Figure 5:
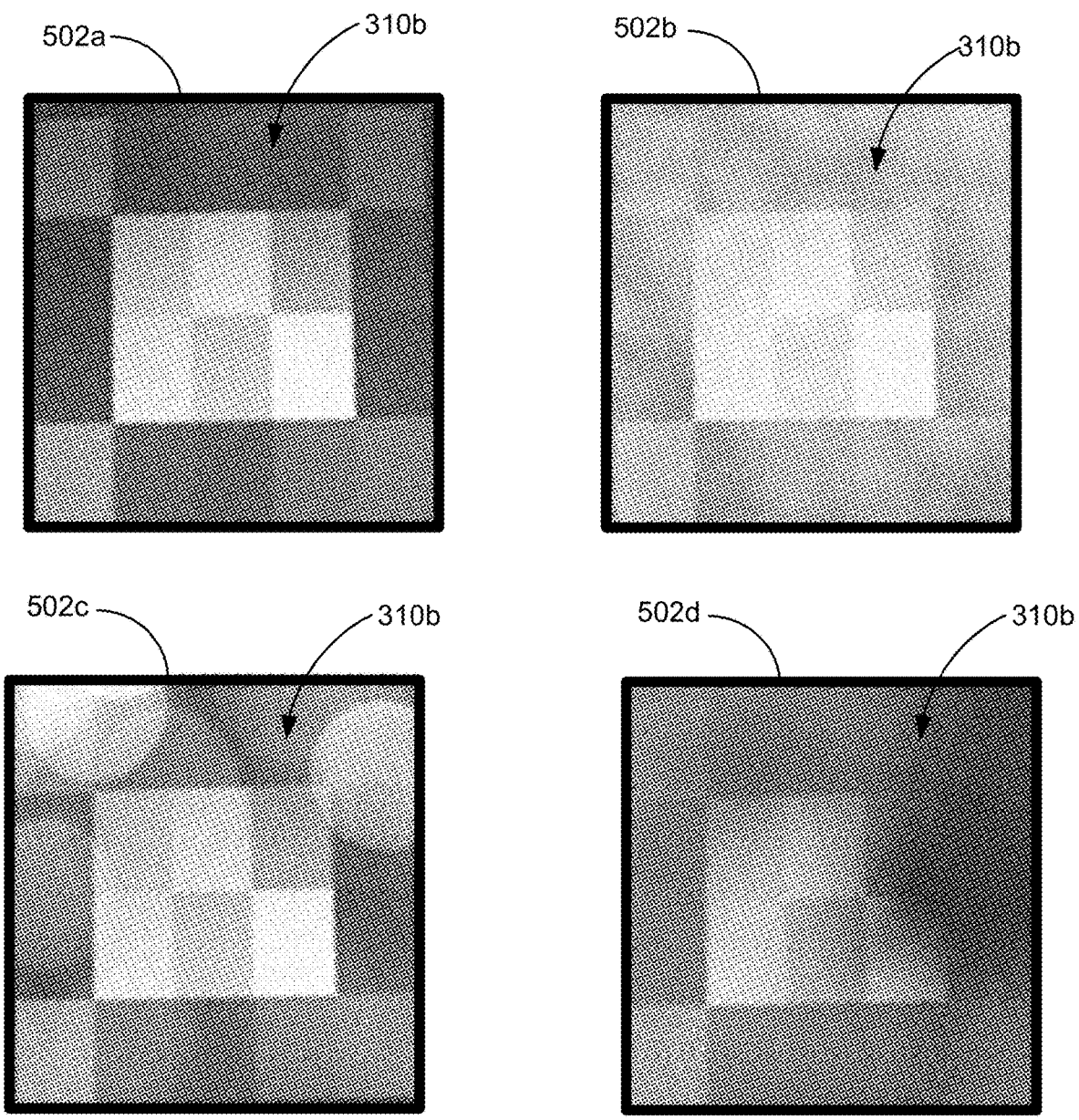
FIG. 5 is a diagram of example calibration patterns.

FIG. 5 is a diagram of four example video images 502a, 502b, 502c, 502d, referred to herein collectively as video images 502, of calibration pattern 310b. Video image 502a is an image of an in-focus grayscale calibration pattern 310b acquired through a clean, uncontaminated lens window 304. Video image 502b is an image of calibration pattern 310b acquired through a lens window 304 that has been contaminated with a mixture of water and dust, i.e., mud. Video image 502c is an image of calibration pattern 310b acquired through a lens window 304 that has been contaminated with water droplets. Video image 502d is an image of calibration pattern 310b acquired through a lens window 304 that has been contaminated with dry dust.

Computing device 115 can compare a video image 502a of a calibration pattern 310b with subsequently acquired video images 502b, 502c, 502d, of calibration pattern 310b. Video image 502a is an example of an image that can be a ground truth image. Subsequent video images 502b, 502c, 502d can be compared to ground truth video image 502a by machine vision techniques including template matching to determine if a lens window is contaminated, and if so, determine an estimated percentage of the video image compromised by the contamination. Determining contamination of a lens window 304 based on comparing a video image 502 acquired with the same calibration pattern 310a with the same lights 312 as a ground truth image can determine lens window 304 contamination with high sensitivity (>90%) and high specificity (<90%) using template matching. Template matching can determine the percentage of lens window 304 area obscured by contamination. Template matching requires a process to measure distortion in an acquired video image 502 and remap the pixels to an undistorted state to achieve and accurate template match. Template matching can also require color correction to compensate for possible changes in color due to changes in illumination.

Computing device can also process acquired video images 502 to determine per-pixel color and intensity. Computing device can inspect each pixel of an input video image and determine RGB and grayscale values to compare to RGB and grayscale values of a ground truth image to determine the percentage contamination at each pixel. By combining area measurements from template matching with average RGB and grayscale values, computing device 115 can determine a single value corresponding to the amount of contamination present and the percentage of incident light transmitted and compare it to a user input threshold value. If the single value is greater than or equal to the user input threshold value, the lens window 304 is determined to be "dirty" and computing device 115 can direct spray nozzle 306 to clean the lens window 304. If the single value is less than the user input threshold value, the lens window 304 is determined to be "clean" and no cleaning is performed. In examples where the lens window 304 is determined to be clean, computing device 115 can further process an acquired video image to determine if the calibration pattern 310 is defective.

Determining lens window 304 contamination with a calibration pattern 310b and lights 312 can provide a highly sensitive and highly specific test for contamination and thereby conserve cleaning fluid; however, deploying lens cover 308 and acquiring a video image 502 can take up to 500 milliseconds (ms). This time period can be too long for a sensor 116 to be covered while the sensor 116 is being used to operate a vehicle 110 on a roadway. For this reason, lens cover 308 is only deployed upon vehicle 110 start and when vehicle 110 stopped, for example in traffic or at a traffic signal. Techniques described herein can inspect a lens window 304 of a sensor 116 while a vehicle 110 is operating to determine an estimated probability that a lens window 304 is contaminated.

While vehicle 110 is operating on a roadway with camera cover 308 in the open position as illustrated in FIG. 3, computing device 115 can determine an estimate of lens window 304 contamination without deploying camera cover 308 based on spectral analysis of the spatial frequencies present in regions of video image data. For example, connection regions of pixels in video image data will have spectral distributions in frequency-domain transformed data that include energy at spatial frequencies corresponding to image noise. Regions of image data corresponding to contamination on a lens window 304 can have less energy at spatial frequencies that correspond to image noise, for example. Image noise is dependent upon random additive and multiplicative error processes applied to pixel data as it is acquired by a video sensor. The multiplicative portion of the error processes is proportional to the amount of light energy acquired by a video sensor and can therefore be used to predict contamination on a lens window due to the presence or absence of light energy for regions of a video image without regard for the size and shape of the contaminated portions of the lens window 304.

Image noise is a random change in a pixel value proportional to signal strength received by a video sensor. Image regions corresponding to areas of a lens window 304 covered by contamination can have less signal strength than image regions corresponding to uncontaminated portions of lens window and therefore less image noise. A video image can be divided into regions $R_i$, for example contiguous blocks of pixels of a minimum size, and each region $R_i$ can be Fourier transformed into frequency domain regions $F_i$. The frequency domain regions $F_i$ can be further divided into high frequency portions based on expected locations of noise energy by including the noise energy in a minimum area enclosing polygon, for example. Image noise can be expected to occur in the frequency domain as data points of positive energy located along a diagonal in the frequency domain as data points at locations determined by the size and shape of the noise data points in image data. Because the noise data has size and shape distributions determined by individual pixel error statistics, analysis of error statistics of image noise data from sample images can determine the expected locations of energy corresponding to image noise. Energy corresponding to image noise can be expected on or near a diagonal line starting at location 0,0 with a slope corresponding to a ratio of image noise x and y dimensions in the spatial domain, at a range of distances from 0,0 in the frequency domain corresponding to the size and shape of the noise in the spatial domain. Because image noise is based on characteristics of the video sensor, the expected locations of energy corresponding to image noise can be determined empirically based on a plurality of sample images that include high noise and low noise portions.

The points of energy corresponding to image noise can be summed over a high frequency portion of a region, wherein the high frequency portion can include a minimal area enclosing polygon that includes locations where energy corresponding to image noise are expected to occur. High frequency portions of frequency domain regions $F_i$ can be determined analyzing a plurality of input images to analyze image noise statistics to determine expected locations for energy corresponding to image noise in transformed images. Energy can be summed energy over a high frequency portion of frequency domain regions and compared to a user input threshold. If the summed energy is greater than or equal to a user input threshold, the entire region is labeled as high noise. If the summed energy is less than a user input threshold, the entire region can be labeled as low noise. A user input threshold can be determined empirically by estimating noise content of sample input images by inspection and selecting a threshold that classifies the sample input images similarly to the estimated noise content.

Spectral analysis can be a very sensitive indicator of lens window 304 contamination, but unfortunately has low specificity, due to an excessively high false alarm rate. Specificity $S_p$ is a measure of false alarm rate and can be determined by the formula $S_p=TN/(TP+FN)$, wherein TN is the true negative rate and FN is the false negative rate for determined lens window 304 contamination. Other causes for low noise information can include low light, overcast sky, and obscuring weather such as fog or mist, for example. Because of its sensitivity, spectral analysis can be used to alert computing device 115 to possible lens window 304 contamination while vehicle 110 is operating. Because spectral analysis has a high false alarm rate, e.g. low specificity, cleaning of lens window 304 can be delayed until the vehicle 110 is stopped and a higher confidence inspection with a calibration pattern 310b and lights 312 can occur. Computing device 115 can issue an auditory or visual alert to any occupants of vehicle 110 and/or schedule a vehicle 110 stop to inspect a lens window 304 with a calibration pattern 310b and lights 312 to determine possible cleaning. Computing device 115 can also actuate vehicle 110 components to execute an immediate stop for testing and cleaning if computing device 115 determines that cleaning is likely required, e.g. more than one sensor 116 with estimated contamination or more than one sensor 116 reporting missing or corrupt data. Reported failure to provide computing device 115 with data for processing can also be a reason to schedule a vehicle 110 stop to inspect lens window 304.

Figure 6:
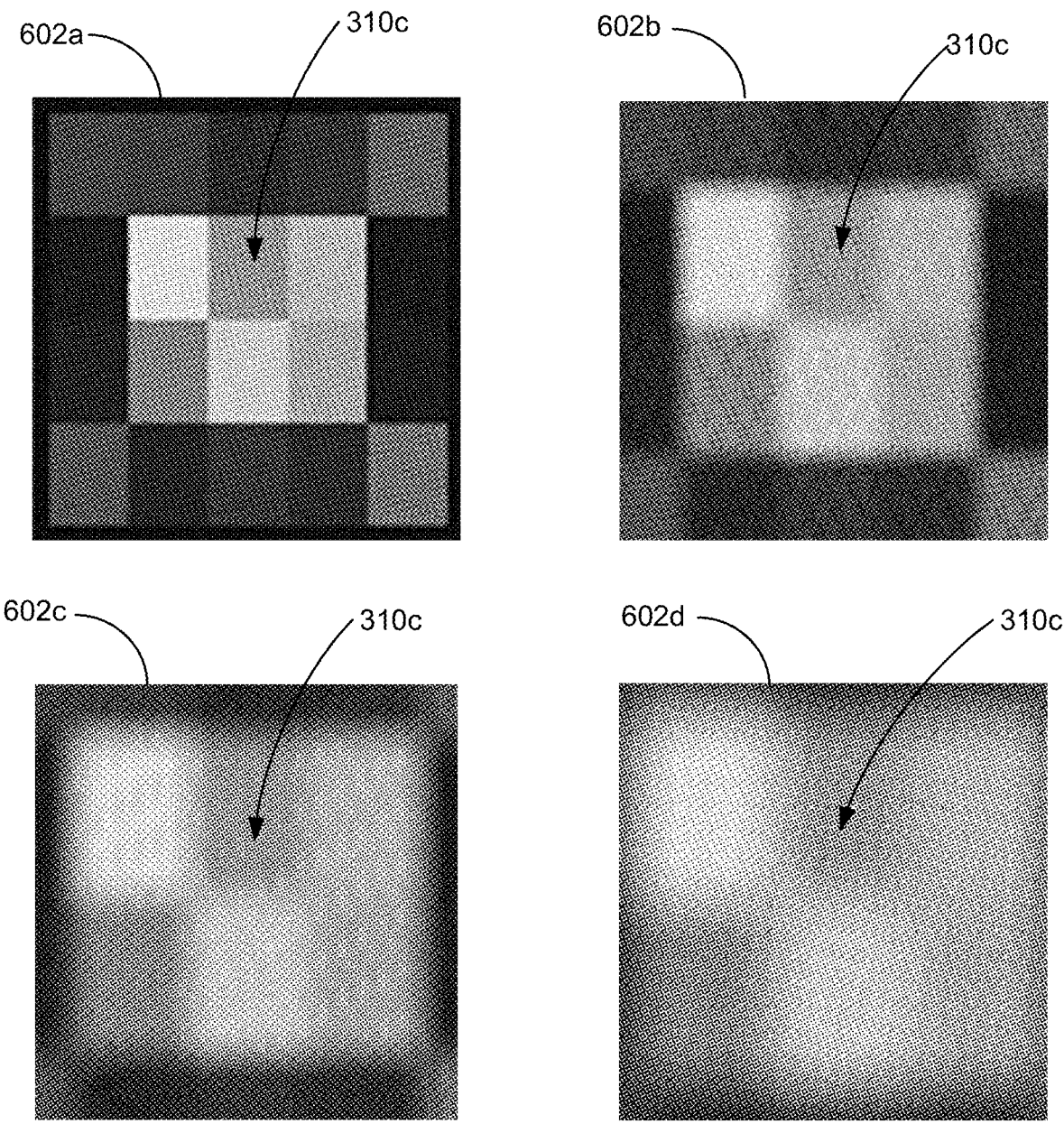
FIG. 6 is a diagram of example calibration patterns.

FIG. 6 is a diagram of video images 602a, 602b, 602c, 602d of a calibration pattern 310c acquired at four different focal distances $D_1$, $D_2$, $D_3$, $D_4$. Video image 602a is acquired a focal distance $D_1$, which can be 920 mm, for example. Focal distance $D_1$ is within the focal range of the video sensor and therefore video image 602a is in focus. Video image 602b is acquired at focal distance $D_2$, which can be 540 mm, without changing the focus of the video sensor, thereby de-focusing or blurring calibration pattern 310c and increasing the apparent size of calibration pattern 310c. Video image 602c is acquired at focal distance $D_3$, which can be 240 mm, again without changing the focus of the video sensor, thereby further defocusing or blurring calibration pattern 310c and further increasing the apparent size of calibration pattern 310c. Video image 602d is acquired at focal distance $D_4$, which can be 125 mm, again without changing the focus of the video sensor, thereby further de-focusing or blurring calibration pattern 310c and further increasing the apparent size of calibration pattern 310c. Because a calibration pattern 310 attached to a lens cover 308 is necessarily out of focus with respect to a far-field video sensor, the calibration pattern can be arranged to compensate for this de-focusing by phase shifting or chromatic defocusing as will be discussed in relation to FIGS. 7 and 8.

Figure 7:
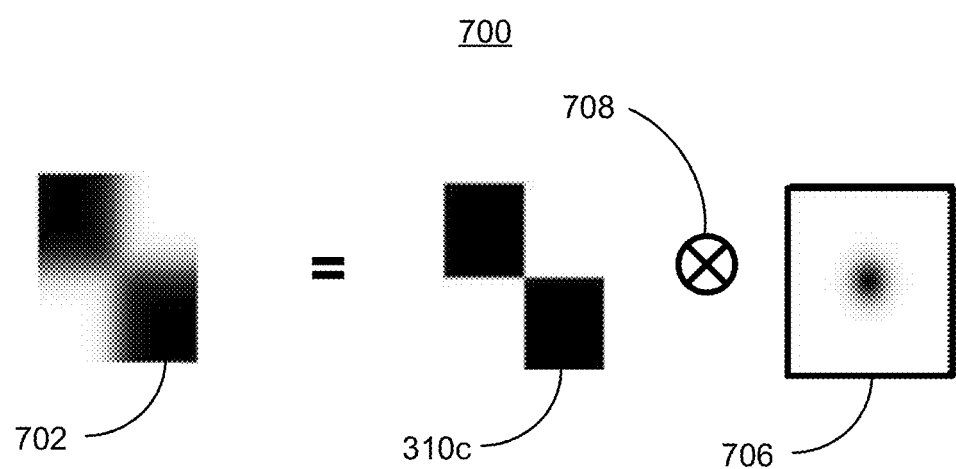
FIG. 7 is a diagram of example Gaussian de-focusing.

FIG. 7 is a diagram of Gaussian de-focusing 700. De-focusing is a mathematical description of the blurring effect on image data that imaging an object such as a calibration pattern 310 placed closer to a video sensor than the video sensor focal range. Gaussian de-focusing assumes that the blurring effect can be described by convolution with a Gaussian function. Video sensors included in a vehicle 110 typically are configured for far field (tens of meters) focal distances. Calibration patterns 310 are presented to the video sensor at a much closer distance, typically tens of millimeters, thereby precluding normal focusing. De-focusing caused by presenting a calibration pattern 310a at a near field distance to a video sensor configured for far field imaging can be described by the equation as illustrated in FIG. 7:

$$I_{blur}(x,y) = I_{sharp}(x,y) \otimes G(x,y) \tag{1}$$

wherein $I_{blur}(x, y)$ is a de-focused calibration pattern 702, $I_{sharp}(x, y)$ is an in-focus calibration pattern 310c, $G(x, y)$ is a 2D Gaussian blur function 706 and $\otimes$ is the symbol for convolution 608. Modifying calibration patterns by introducing phase-shifting elements based on 2D Gaussian blur function 706 can increase the sensitivity and specificity of contamination detection by increasing the apparent resolution of calibration patterns 310c in acquired video images. Phase-shifting elements use information regarding the 2D Gaussian blur function 706 to determine pattern features that include spatial frequencies that will cause aliasing as a result of the 2D Gaussian blur function 706 to create image features at a higher resolution than would be expected given the limitations imposed by the 2D Gaussian blur function. Aliasing describes a system response wherein incident energy at a frequency beyond the Nyquist frequency of the system is coupled into the system by creating sub-harmonic frequencies below the Nyquist frequency and communicating the energy at the sub-harmonic frequencies. The Nyquist frequency is one-half the highest frequency capable of being acquired by a system and is the highest frequency information obtainable by the system. For example, to accurately obtain information at a selected frequency, the system must be capable of acquiring data at twice the selected frequency.

Figure 8:
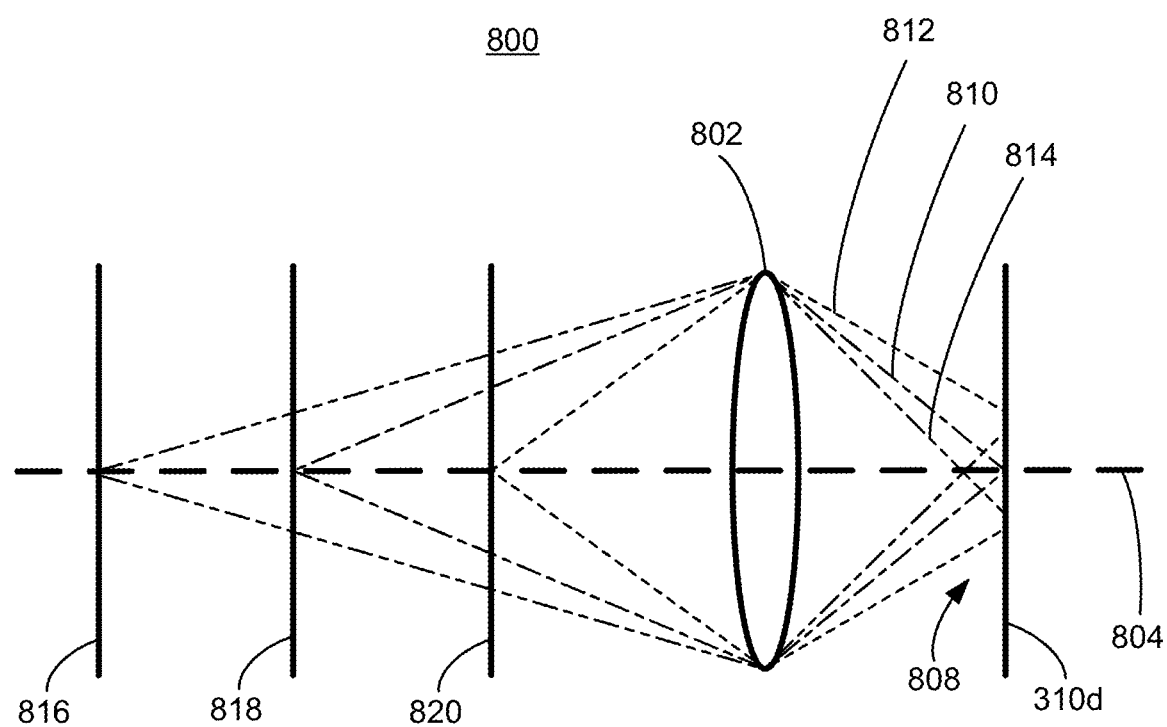
FIG. 8 is a diagram of example chromatic de-focusing.

FIG. 8 is a diagram of example chromatic de-focusing 800, including a lens 802 with an optical axis 804. A calibration pattern 310d including points 808 that reflect, transmit, or emit light of one or more colors. Two representative light rays 810, indicated by long dash-short dashed lines, are radiated at a first color from a first point 808. Light rays 810 pass through lens 802 and are focused to converge at focal plane 818. Focal plane 818 can be the location of a video sensor, for example. Light rays 812, indicated by short dashed lines, are radiated from second color points 808 spaced apart on calibration pattern 310d. Light rays 812 are focused by lens 802 to converge onto a first de-focus plane 818. Light rays 814, indicated by long dash-two short dashed lines, are radiated from third color points 808 spaced apart on calibration pattern 310d. Light rays 814 are focused by lens 802 onto a second de-focus plane 816. By determining which color is in focus in an acquired video image, computing device 115 can determine whether calibration pattern 310d is behind, at, or in front of an image plane associated with focal plane 820.

By configuring color light points 808 on calibration pattern 310d, the location of calibration pattern 310d along optical axis 804 can change while focal plane 818 and first and second de-focus planes 816, 818 remain the same. In this manner, calibration pattern 310d can be positioned at a near distance (10s of millimeters) from far field (10s of meters) focused lens 802, wherein color light points 808 on calibration pattern 310d can be configured to determine positions of calibration pattern 310d along optical axis 804 wherein the position is controlled by second actuator 404. Calibration pattern 310d can also be transparent, or including and IR filter, to transmit natural or artificial light to permit computing device 115 to determine focus information. High dynamic range imaging is also possible by modulating acquired light data with an LCD pattern on a transparent calibration pattern 310d. Acquired color video image data can be processed to determine color pattern focus by filtering color video image data to process each color separately. Calibration pattern 310d can be moved small distances along optical axis 804 with a second actuator as discussed above in relation to FIG. 4 to bring calibration pattern to a determined distance from focal plane 820. GGGR video sensors, wherein a greyscale and an image with only the red color channel active are acquired, can be processed by extracting color information from the greyscale image based on location in the image or shape of a feature in addition to spectrum.

Both Gaussian de-focusing 700 and chromatic de-focusing 800 can be used to determine a distance of a calibration pattern 310d from a focal plane 818 of a video sensor and thereby determine the focus of the calibration pattern 310d. Determining the focus of a calibration pattern 310d can improve the sensitivity and specificity of a machine vision process to determine contamination by providing exact amount of de-focusing. Although the calibration pattern 310d is out of focus, determining a repeatable position for calibration pattern 310d can provide repeatable focus, thereby permitting a machine vision process to determine contamination by template matching in a repeatable fashion.

Figure 9:
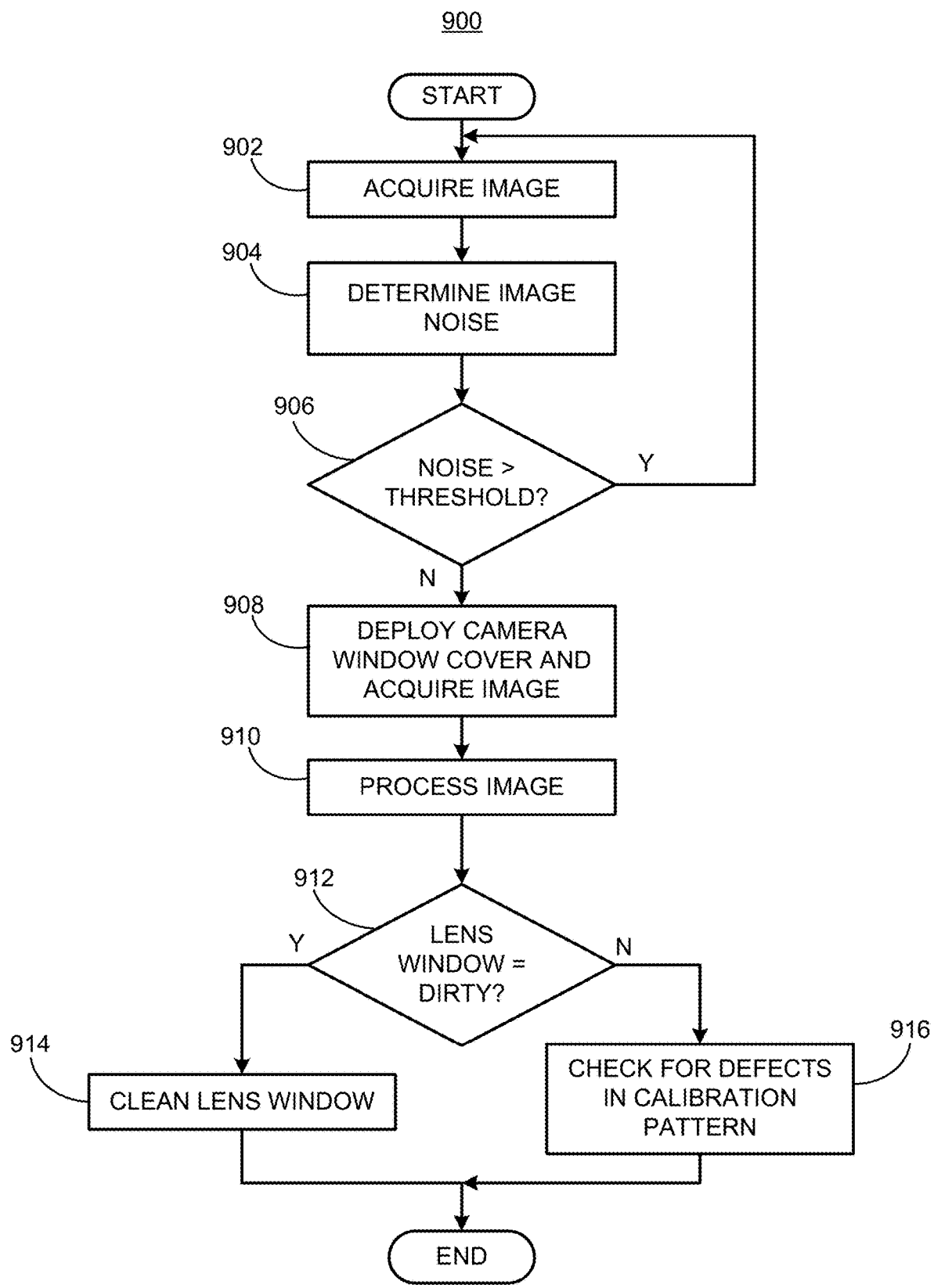
FIG. 9 is a flowchart diagram of a process to clean a vehicle lens window.

FIG. 9 is a diagram of a flowchart, described in relation to FIGS. 1-7, of a process 900 for cleaning a lens window 304 while operating a vehicle 110. Process 900 can be implemented by a processor of computing device 115, taking as input information from sensors 116, and executing commands and sending control signals via controllers 112, 113, 114, for example. Process 900 includes multiple blocks taken in the disclosed order. Process 900 could alternatively or additionally include fewer blocks or can include the blocks taken in different orders.

Process 900 begins at block 902, wherein a computing device 115 in a vehicle acquires a video image from a video sensor included in a sensor housing 302 included in a vehicle 110 operating on a roadway, for example. Camera cover 308 is in the open position, and lens cover 304 is exposed to the external environment.

At block 904, computing device 115 can process the video image by transforming image data, captured as described with respect to the block 902, with a Fourier transform into a frequency domain, wherein the frequency information corresponding to the image data can be processed by regions to determine frequency distribution and thereby classify regions. Classified regions can be compared to regions from previously processed image data to determine how regions are changing and if the changes are persistent. Regions that change from high noise to low noise and stay low can be flagged as possibly contaminated. As discussed above in relation to FIG. 3, to flag possible contamination a video image can be divided into a plurality of regions $R_i$, wherein each region $R_i$ can be Fourier transformed into frequency regions $F_i$. The frequency regions $F_i$ can be further divided into high frequency portions based on expected locations of noise energy and a single value for each region can be determined by integrating (summing) over each high frequency portion. A plurality of regions with similar frequency portion values can be combined and a single value for each aggregate region can be determined by averaging the high frequency values for the plurality of regions. Regions can be determined to be high noise or low noise by comparing the averaged high frequency values to a user input threshold.

At block 906 computing device 115 determines if any regions have noise values as measured by spectral analysis greater than a user input threshold value. If regions of the acquired image regions have noise values greater than a user input threshold, control passes back to block 902 and another image is acquired. If regions of the acquired image have noise values less than a user input threshold as discussed above in relation to FIG. 5, control passes to block 908.

At block 908, computing device 115 waits for the first opportunity to deploy camera cover 308 and inspect lens window 304. Because deploying camera cover 308 can take up to 500 milliseconds to perform, computing device 115 can wait until vehicle 110 is stopped in traffic before deploying camera cover 308. When vehicle 110 is stopped, computing device 115 can direct actuator 314 to deploy camera cover 308 thereby positioning calibration pattern 310a and lights 312 on an optical axis 402 of a video sensor and acquire a video image of a calibration pattern 310a, 310b, 310c, 310d, herein collectively as calibration pattern 310.

At block 910, computing device 115 processes the acquired video image using template matching to determine if the lens window 304 is contaminated. Computing device 115 can translate and rotate image data to determine the best fit and subtract ground truth image data to determine possible contamination. For example, the conventional technique of normalized correlation can determine translations and rotations of a pattern in a plane with respect to its nominal location. Convolutional neural networks can be trained to recognize contamination in image data, for example. Per-pixel color and intensity data are determined for image data and compared to previously acquired image data. The contamination data can be combined with the color and intensity data.

At block 912, combined contamination, color and intensity data from block 910 is compared to a user input threshold value. For example, contamination can be rated of a scale from 0, or no contamination, to 1, or fully contaminated. Color can be transformed into a four- or five-bit value from an RGB pixel value, and where intensity is the sum of R+G+B. Contamination can be compared to a user input threshold value, conditioned on the color and intensity. If the combined contamination, color and intensity data are less than the user input threshold value, the lens window 304 is determined to be clean and control passes to block 916. If the combined contamination, color and intensity data is greater than or equal to the user input threshold value, lens window 304 is determined to be dirty and control passes to block 914.

At block 914, computing device 115 directs spray nozzle 306 to spray one or more of a liquid and air onto a lens window 304 to clean contamination from the lens window 304. Following cleaning, computing device 115 can acquire another video image and process the video image to determine if the lens window 304 was truly cleaned. If the lens window 304 is determined to be dirty, the process can be repeated. Following block 914 process 900 ends.

At block 916, computing device 115 inspects a difference image between an acquired video image and a ground truth video image. Because the acquired video image has been determined to be acquired with a clean lens window 304, defects or differences greater than a user input threshold between the acquired video image and the ground truth video image can be attributable to defects in the calibration pattern 310 and flagged as potential defects in calibration pattern 310. Detected defects can be stored at computing device 115 for use in future processing. For example, a flagged defect region can be re-checked after re-cleaning to see if it remains. Computing device 115 can alert an occupant and transmit a message to request service to server computer 120. Computing device 115 can exclude flagged defect region from processing in future acquired video images. Following block 916 process 900 ends.

Figure 10:
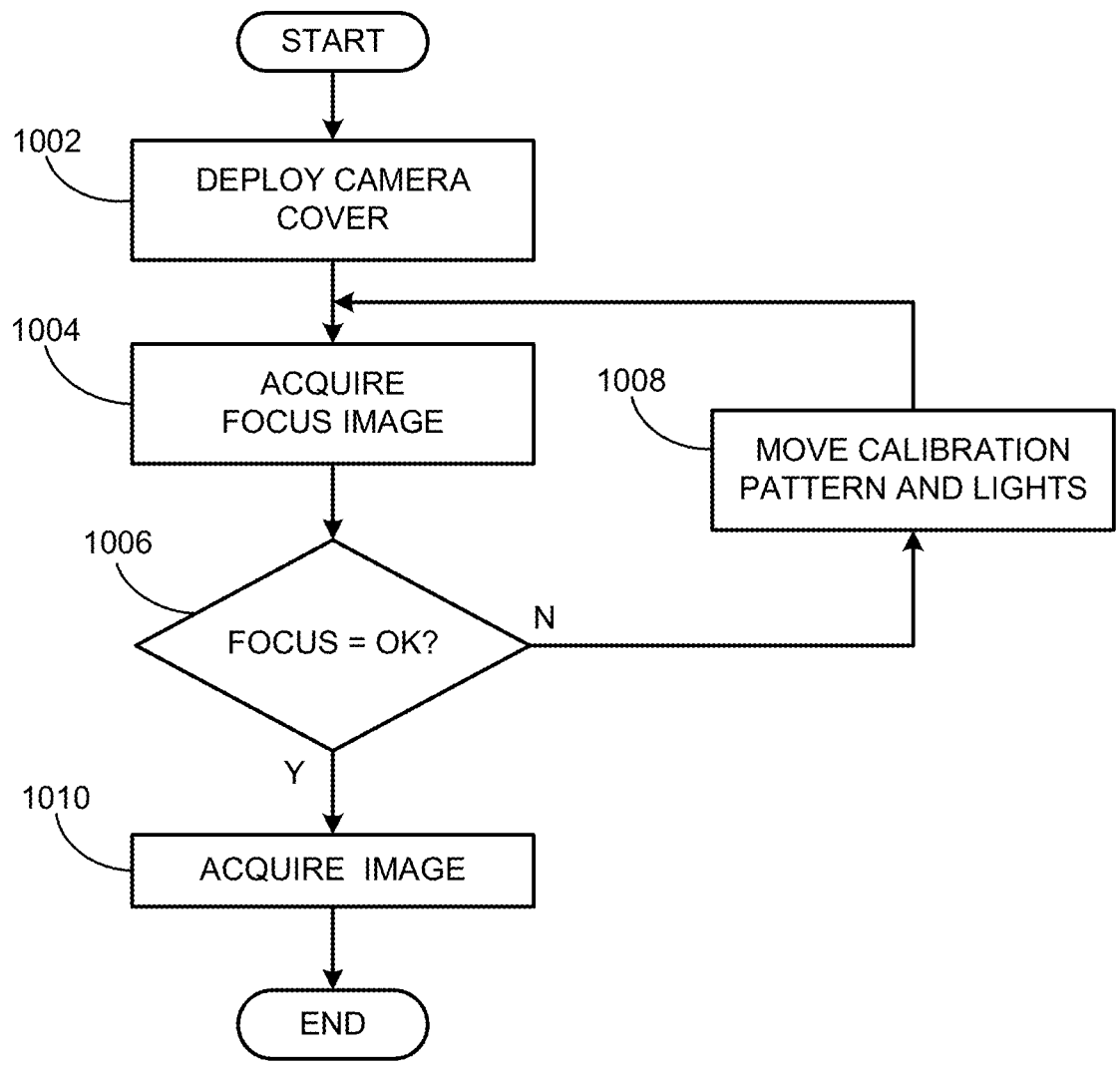
FIG. 10 is a flowchart diagram of a process to deploy a camera cover and move a calibration pattern.

FIG. 10 is a diagram of a flowchart, described in relation to FIGS. 1-7, of a process 1000 for deploying and focusing a lens window 304, e.g., process 1000 could be executed as a sub-process of the process 900, e.g., of the block 908. Process 1000 can be implemented by a processor of computing device 115, taking as input information from sensors 116, and executing commands and sending control signals via controllers 112, 113, 114, for example. Process 1000 includes multiple blocks taken in the disclosed order. Process 1000 could alternatively or additionally include fewer blocks or can include the blocks taken in different orders.

Process 1000 begins at block 1002, wherein computing device 115 directs actuator 314 to deploy a camera cover 308 as discussed above in relation to FIG. 2. Actuator 314 deploys camera cover 308 to position calibration pattern 310 and lights 312 on an optical axis 402 of a video sensor.

At block 1004, computing device 115 acquires an image with the video sensor for focusing.

At block 1006, computing device 115 processes the image using Gaussian de-focusing 700 or chromatic de-focusing 800 to determine focus information for a calibration pattern 310 as discussed above in relation to FIGS. 6 and 7. If the focus image is determined to be out of focus, control passes to block 1008. If the focus image is determined to be in focus, control passes to block 1010.

At block 1008, computing device 115 directs a second actuator to move calibration pattern 310 and lights 312 along the optical axis 402 of the video sensor to bring the calibration pattern into user selected focus. Following block 1008, control passes to block 1004 to acquire another focus image to determine if the calibration pattern 310 is in focus.

At block 1010, calibration pattern 310 is determined to be in focus and a video image is acquired for computing device 115 to process to determine if the lens window 304 is contaminated. Following block 1010 process 1000 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Cobol, Visual Basic, Java Script, Perl, Python, Lisp, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory.

Common forms of computer-readable media include, for example, a floppy disk, a flexible disk, hard disk, magnetic tape, any other magnetic medium, a CD-ROM, DVD, any other optical medium, Core rope memory, Selectron tube, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A system, comprising:
a light source;
a camera cover including a calibration pattern;
a first actuator connected to the camera cover and the light source to move the camera cover in a first direction along a lens window of the camera to deploy the calibration pattern and the light to cover the lens window of the camera; and
a second actuator movingly connected to the calibration pattern and the light source to move the calibration pattern and the light in a second direction along an optical axis of the camera, the optical axis extending through the lens window, to change the focus of the calibration pattern.

2. The system of claim 1, further comprising a computer programmed to actuate the first actuator to move the camera cover and the light source to cover the lens window of the camera based on spectral analysis of image data.

3. The system of claim 2, further comprising a fluid spray nozzle arranged to spray one or more of a fluid and air onto the lens window of the camera wherein the computer is further programmed to determine when to spray the fluid and air based on analyzing an image of the calibration pattern to determine if the lens window is clean or dirty.

4. The system of claim 3, wherein determining if the lens window is clean or dirty is based on a ground truth image of the calibration pattern.

5. The system of claim 3, wherein the computer is further programmed to actuate the second actuator to move the calibration pattern and the light source along the optical axis of the camera based on determining when the image of the calibration pattern is in focus.

6. The system of claim 5 wherein determining when the image of the calibration pattern is in focus is based on one or more of a color-coded calibration pattern and phase-shifting.

7. The system of claim 1, wherein the calibration pattern includes one or more of a plurality of black and white figures and a plurality of color figures.

8. The system of claim 1, wherein the calibration pattern includes one or more of a reflective display, a back-lit LCD display, an LED display and a phosphorescent material.

9. The system of claim 1, wherein the light source includes one or more of front-light LEDs, back-light LEDs, and display LEDs.

10. A system, comprising a computer that includes a processor and a memory, the memory storing instructions executable by the processor to:
actuate a first actuator connected to a camera cover and the light source to move the camera cover in a first direction along a lens window of the camera to deploy the calibration pattern and the light to cover the lens window of the camera; and
actuate a second actuator movingly connected to the calibration pattern and the light source to move the calibration pattern and the light in a second direction along an optical axis of the camera, the optical axis extending through the lens window, to change the focus of the calibration pattern.

11. The system of claim 10, wherein the instructions further include determining when to move the calibration pattern and light source to cover the lens window of the camera based on spectral analysis of image data.

12. The system of claim 10, wherein the instructions further include actuating a fluid spray nozzle directed to the lens window of the camera upon determining that the lens window is clean or dirty based on analyzing an image of the calibration pattern wherein the fluid spray nozzle is arranged to spray one or more of a fluid and air onto the lens window of the camera.

13. The system of claim 12, wherein determining if the lens window is clean or dirty based on a ground truth image of the calibration pattern.

14. The system of claim 10, wherein the instructions further include actuating the second actuator to move the calibration pattern and the light source along the optical axis of the camera based on determining when an image of the calibration pattern is in focus.

15. The system of claim 14 wherein determining when the image of the calibration pattern is in focus is based on one or more of a color-coded calibration pattern and phase-shifting.

16. The system of claim 10, wherein the calibration pattern includes one or more of a plurality of black and white figures and a plurality of color figures.

17. The system of claim 10, wherein the calibration pattern includes one or more of a reflective display, a back-lit LCD display, an LED display and a phosphorescent material.

18. The system of claim 10, wherein the light source includes one or more of front-light LEDs, back-light LEDs, and LED displays.

19. A method, comprising:
- actuating a first actuator connected to the camera cover and the light source to move the camera cover in a first direction along a lens window of the camera to deploy a calibration pattern and the light to cover the lens window of the camera; and
- actuating a second actuator movingly connected to the calibration pattern and the light source to move the calibration pattern and the light in a second direction along an optical axis of the camera, the optical axis extending through the lens window, to change the focus of the calibration pattern.

20. The method of claim 19, further including determining when to actuate the camera cover and light source to cover the lens window based on spectral analysis of camera image data.

* * * * *